United States Patent
Gordon et al.

(10) Patent No.: US 11,283,835 B1
(45) Date of Patent: Mar. 22, 2022

(54) SYSTEMS AND METHODS FOR ESTABLISHING A SECURE COMMUNICATION LINK IN AN ELECTRIC POWER DISTRIBUTION SYSTEM

(71) Applicant: Schweitzer Engineering Laboratories, Inc., Pullman, WA (US)

(72) Inventors: Colin Gordon, Katy, TX (US); Jason A. Dearien, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/126,331

(22) Filed: Dec. 18, 2020

(51) Int. Cl.
*H04L 9/08* (2006.01)
*H04L 29/06* (2006.01)

(52) U.S. Cl.
CPC .......... *H04L 63/162* (2013.01); *H04L 9/0819* (2013.01); *H04L 9/0838* (2013.01); *H04L 63/0435* (2013.01); *H04L 63/126* (2013.01)

(58) Field of Classification Search
CPC ... H04L 63/162; H04L 9/0819; H04L 9/0838; H04L 63/0435; H04L 63/126; H04L 63/0876; G05B 2219/32404; Y02B 90/20; Y02B 70/30; Y02E 40/70; Y04S 10/18
See application file for complete search history.

(56) References Cited

U.S. PATENT DOCUMENTS

| | | | |
|---|---|---|---|
| 6,751,562 B1* | 6/2004 | Blackett | G05B 19/4185 702/61 |
| 6,961,641 B1* | 11/2005 | Forth | G06Q 50/06 700/295 |
| 7,729,276 B2 | 6/2010 | Akyol | |
| 7,870,595 B2* | 1/2011 | Finney | H04L 63/102 726/1 |
| 8,515,348 B2* | 8/2013 | Kagan | G01R 22/063 455/41.2 |
| 10,491,569 B1* | 11/2019 | Powell, III | H04L 63/0428 |
| 10,623,436 B2* | 4/2020 | Mohan | H04L 63/02 |
| 2007/0162957 A1* | 7/2007 | Bartels | G05B 15/02 726/2 |
| 2008/0109889 A1* | 5/2008 | Bartels | H04L 63/10 726/7 |
| 2011/0249816 A1* | 10/2011 | Choi | H04L 63/065 380/279 |
| 2014/0277801 A1* | 9/2014 | Cioraca | H04W 12/069 700/292 |
| 2015/0215283 A1* | 7/2015 | Fischer | H04L 63/029 726/14 |
| 2016/0036813 A1* | 2/2016 | Wakumoto | H04L 63/0272 713/171 |
| 2017/0272944 A1* | 9/2017 | Link, II | H04W 76/10 |
| 2019/0116183 A1 | 4/2019 | Hussain | |

(Continued)

*Primary Examiner* — Techane Gergiso
(74) *Attorney, Agent, or Firm* — Fletcher Yoder, P.C.

(57) ABSTRACT

A system includes an intelligent electronic device (IED) and a control system configured to perform operations that include initiating establishment of a media access control security (MACsec) communication link via a MACsec key agreement (MKA) protocol, identifying information associated with the IED in response to initiation of the establishment of the MACsec communication link, the information being indicative of a protocol to be used by the IED to communicate data, and establishing a unidirectional MACsec communication link based on the information associated with the IED.

19 Claims, 4 Drawing Sheets

(56) References Cited

U.S. PATENT DOCUMENTS

2019/0173860 A1 6/2019 Sankaran
2019/0342101 A1 11/2019 Hayes
2020/0106719 A1 4/2020 Acharya

* cited by examiner

SYSTEMS AND METHODS FOR ESTABLISHING A SECURE COMMUNICATION LINK IN AN ELECTRIC POWER DISTRIBUTION SYSTEM

BACKGROUND

This disclosure relates to systems and methods for establishing a secure communication link or channel between different components of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system during operation of the electric power distribution system. For example, the IED may receive and/or transmit a signal and/or data in order to perform a functionality, such as to control a circuit breaker in response to electrical measurements of the electric power distribution system. Unfortunately, it may be difficult to establish a secure communication link between the IED and other components of the electric power distribution system to enable the components to securely communicate with one another.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a system includes an intelligent electronic device (IED) and a control system configured to perform operations that include initiating establishment of a media access control security (MACsec) communication link via a MACsec key agreement (MKA) protocol, identifying information associated with the IED in response to initiation of the establishment of the MACsec communication link, the information being indicative of a protocol to be used by the IED to communicate data, and establishing a unidirectional MACsec communication link based on the information associated with the IED In an embodiment, a tangible, non-transitory, computer-readable medium includes instructions that, when executed by processing circuitry, are configured to cause the processing circuitry to perform operations that include initiating establishment of a media access control security (MACsec) communication channel with an intelligent electronic device (IED) of an electric power distribution system via a MACsec key agreement (MKA) protocol, receiving information from the IED during establishment of the MACsec communication channel, the information being indicative of a protocol to be used by the IED to communicate data, and establishing a transmission-type unidirectional MACsec communication channel, a receiving-type unidirectional MACsec communication channel, or both, based on the information received from the IED In an embodiment, an intelligent electronic device (IED) of an electric power distribution system includes processing circuitry and memory storing instructions. The instructions, when executed by the processing circuitry, are configured to cause the processing circuitry to perform operations that include transmitting information to a switch during establishment of a media access control security (MACsec) communication link between the IED and the switch, the information being indicative of a protocol used by the IED to communicate data, receiving establishment of a unidirectional MACsec communication link between the IED and the switch based on the information, and communicating data with the switch via the unidirectional MACsec communication link.

DETAILED DESCRIPTION

Figure 1:
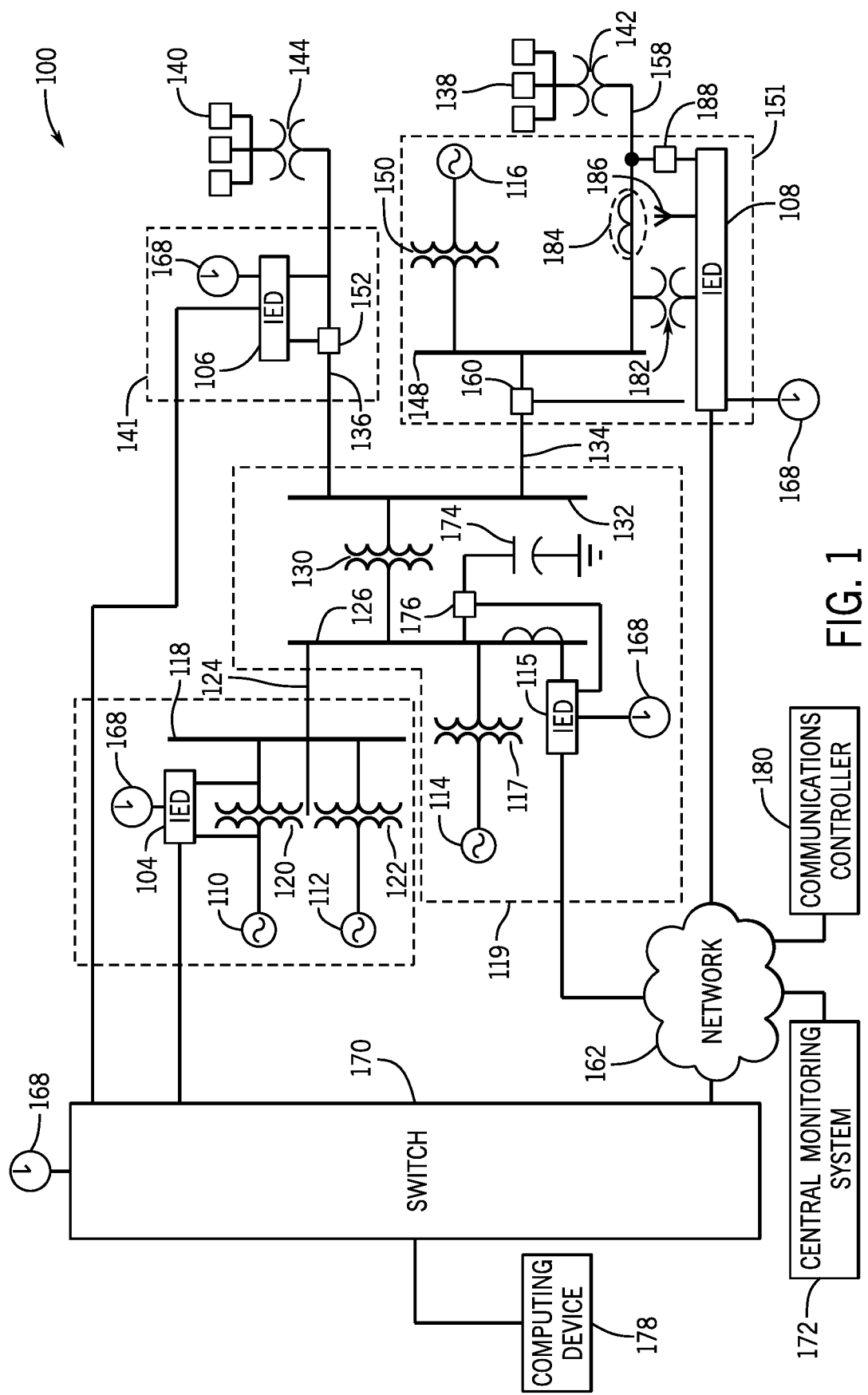
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link or channel between components of an electric power distribution system. Intelligent electronic devices (IEDs) may be used to control certain devices and to perform certain operations of the electric power distribution system. For example, an IED may be a relay that enables or blocks electrical power flow between other components of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of components of the electric power distribution system. As such, the IEDs may facilitate operation of the electric power distribution system.

The electric power distribution system may include a switch that enables data to be transmitted between IEDs, thereby enabling the IEDs to communicate with one another. For example, the switch may receive data from a first IED and then transmit the data to a second IED to enable the first IED and the second IED to communicate the data with one another. In some embodiments, the switch may establish a respective media access control security (MACsec) communication link or channel and/or a respective MACsec key agreement (MKA) connectivity association with the IEDs and/or with other components to communicate data. To establish the MACsec communication link, an MKA protocol is used to enable communications between the switch and the IED During the MKA protocol, the switch may select a connectivity association key (CAK) from a set of keys (e.g., a set of keys generated by the switch, a set of keys received from the controller) and may distribute the CAK or a copy of the CAK to the IED via an adoption link. The switch may establish an MKA connectivity association upon verification that the IED possesses the CAK. The switch may then select a security association key (SAK) from the set of the keys for distribution to the IED via the MKA connectivity association. The switch may retain a copy of the same SAK, and the switch and the IED may use their respective copies of the SAK to establish a MACsec communication link for communicating with one another. For example, each of the switch and the IED may encrypt data using their copy of the SAK and/or may decrypt encrypted data using their copy of the SAK in order to transmit data securely between one another. In additional or alternative embodiments, a MACsec communication link and/or an MKA connectivity association may be established between IEDs to enable the IEDs to communicate data with one another in a point-to-point manner. That is, the IEDs may directly communicate with one another without use of a switch.

Embodiments of the present disclosure are directed to establishing a unidirectional MACsec communication link or channel that enables data to flow in a direction (e.g., from an IED to a switch, from an IED directly to another IED) and to prevent, block, or inhibit data from flowing in an opposite direction (e.g., from the switch to the IED) By way of example, during establishment of the MACsec communication link via the MKA protocol, an IED may transmit information to the switch to indicate whether the IED is to receive data (e.g., in which the IED is a subscriber) and/or whether the IED is to transmit data (e.g., in which the IED is a publisher). For instance, the information may include a protocol that is used by the IED to communicate data, such as a Generic Object Oriented Substation Event (GOOSE) protocol, an address resolution protocol (ARP), and the like. The switch may analyze the information received from the IED to determine the type or the directionality of the MACsec communication link(s) to be established between the switch and the IED to enable data to be communicated in a desirable manner.

As an example, in response to determining that the IED is to transmit data, the switch may establish a transmission-type unidirectional MACsec communication link to enable the IED to transmit data to the switch and to block data from being transmitted from the switch to the IED As another example, in response to determining the IED is to receive data, the switch may establish a receiving-type unidirectional MACsec communication link to enable the IED to receive data from the switch and to block data from being transmitted from the IED to the switch. In this manner, the switch may block data from being undesirably transmitted between IEDs. For example, the switch may block data from being transmitted by an IED that should receive data (e.g., data transmitted via a first protocol) or block data from being received by an IED that should transmit data (e.g., data transmitted via a second protocol). As a result, the establishment of the unidirectional MACsec communication links or channels may improve an accuracy of data transmission between components to improve an operation of the electric power distribution system.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the switch 170. The switch 170 may receive the data and may subsequently transmit the data to an intended recipient of the data. The switch 170 may also control data flow between one of the IEDs 104, 106, 108, 115 and another component communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

A communications controller 180 may interface with equipment in the communications network 162 to create an SDN that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

In some embodiments, the switch 170 and the IEDs 104, 106, 108, 115 may communicate with one another via a MKA connectivity association and/or a MACsec communication link or channel. The MACsec communication link may be initiated via SAKs distributed to enable encryption and/or decryption of data. To this end, the switch 170 or another key device (e.g., a key server) may generate and distribute keys, such as CAKs and/or SAKs, to the IEDs 104, 106, 108, 115 to establish the MKA connectivity association and/or the MACsec communication link. For instance, the switch 170 may establish an MKA connectivity association with one of the IEDs 104, 106, 108, 115 via an MKA protocol that includes establishing an adoption link between the switch 170 and the IED, distributing a CAK to the IED via the adoption link, establishing an MKA connectivity association with the IED based on a verified possession of the CAK, distributing a SAK to the IED via the MKA connectivity association, and communicating data with the IED using the SAK. Indeed, the switch 170 and the IED may use identical copies of the same SAK to encrypt data to be transferred as well as to decrypt encrypted data that has been received. Such encrypted data is transferred via a MACsec communication link established between the components to transfer the data securely. Although the present disclosure primarily discusses the use of MKA connectivity associations and MACsec communication links to communicate data, any other suitable communication techniques may be used to communicate data between components of the electric power distribution system 100.

Figure 2:
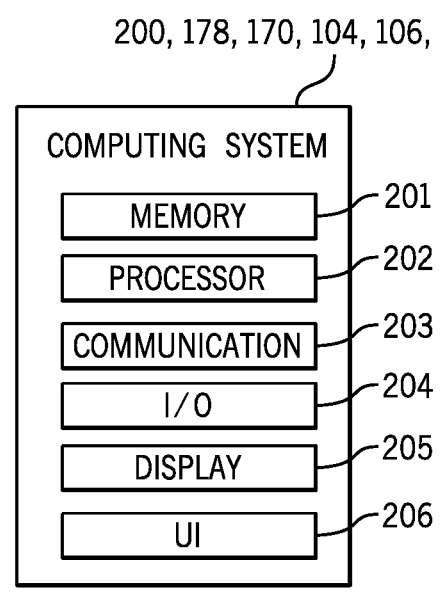
FIG. 2 is a schematic diagram of an embodiment of a computing system that may be incorporated in a component of an electric power distribution system, in accordance with an embodiment of the present disclosure of the present disclosure.

FIG. 2 is a schematic diagram of an embodiment of a computing system 200 that may be incorporated within a component of the electric power distribution system 100, such as in any of the IEDs 104, 106, 108, 115, the switch 170, and/or the computing device 178. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
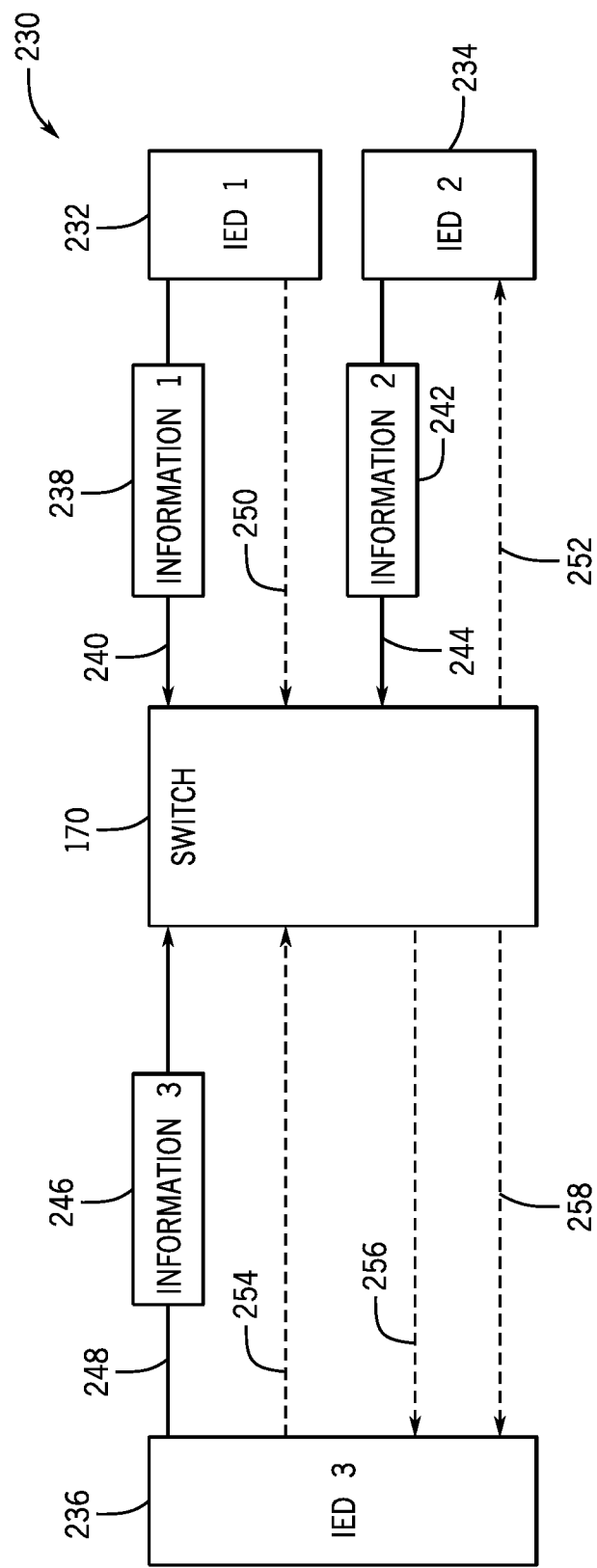
FIG. 3 is a schematic diagram of an embodiment of a communication link in which IEDs are communicatively coupled to a switch configured to transmit data between the IEDs, in accordance with an embodiment of the present disclosure.

FIG. 3 is a schematic diagram of an embodiment of a communication network 230 that includes the switch 170. The switch 170 may be communicatively coupled to various IEDs, including a first IED 232, a second IED 234, and a third IED 236. In additional or alternative embodiments, the switch 170 may be communicatively coupled to any suitable number of IEDs. The switch 170 may establish MKA connectivity associations and/or MACsec communication links between the IEDs 232, 234, 236. As described above, an MKA protocol may be used to establish the MKA connectivity associations and/or the MACsec communication links. During the MKA protocol, initial information may be exchanged between one of the IEDs 232, 234, 236 and the switch 170 (e.g., via the MKA connectivity association) to establish a particular MACsec communication link. As an example, the information may be in the form of an MKA type length value (TLV) or parameter set type (PST), indication of a MACsec port identifier (PI), a traffic type indication (e.g., MAC address, Internet protocol address, Transmission Control Protocol port, User Datagram Protocol port, EtherType), another suitable form, or any combination thereof.

In the illustrated embodiment, the first IED 232 may be configured to transmit first information 238 to the switch 170 via a first MKA connectivity association 240, the second IED 234 may be configured to transmit second information 242 to the switch 170 via a second MKA connectivity association 244, and the third IED 236 may be configured to transmit third information 246 to the switch 170 via a third MKA connectivity association 248. The information 238, 242, 246 exchanged between the switch 170 and the IEDs 232, 234, 236 may indicate whether a transmission-type unidirectional MACsec communication link, a receiving-type unidirectional MACsec communication link, or both, is to be established between the switch 170 and one of the IEDs 232, 234, 236. By way of example, the information may include information regarding a communication protocol used by each of the IEDs 232, 234, 236, whether any of the IEDs 232, 234, 236 are a publisher (e.g., for transmitting data) and/or a subscriber (e.g., for receiving data), and/or other suitable information indicative of the MACsec communication link type to be established.

As an example, based on the first information 238, the switch 170 may establish a first MACsec communication link 250, which may be a transmission-type unidirectional MACsec communication link that enables the first IED 232 to transmit subsequent data to the switch 170. For example, the first IED 232 may use an SAK to encrypt data and to transmit the encrypted data to the switch 170 via the first MACsec communication link 250. However, the first IED 232 may not be able to receive data (e.g., encrypted data) from the switch 170 or from any other component via the first MACsec communication link 250. Further, the switch 170 may not be able to establish any other MACsec communication link that would enable the first IED 232 to receive encrypted data from the switch 170 (e.g., data transmitted by one of the other IEDs 234, 236 to the switch 170). In this manner, the first IED 232 may only transmit encrypted data to and not receive encrypted data from the switch 170.

As another example, based on the second information 242, the switch 170 may establish a second MACsec communication link 252, which may be a receiving-type unidirectional MACsec communication link 252 that enables the second IED 234 to receive subsequent data from the switch 170. For instance, the switch 170 may use an SAK to encrypt data and to transmit the encrypted data to the second IED 234 via the second MACsec communication link 252. However, the second IED 234 may not be able to transmit data to the switch 170 or to any other component via the second MACsec communication link 252. Indeed, the switch 170 may not be able to establish any other MACsec communication link that would enable the second IED 234 to transmit data to the switch 170 (e.g., for transmission to one of the other IEDs 232, 236). As such, the second IED 234 may only receive encrypted data from and not transmit encrypted data to the switch 170.

As a further example, based on the third information 246, the switch 170 may establish a third MACsec communication link 254, which may be a transmission-type unidirectional MACsec communication link that enables the third IED 236 to transmit encrypted data to the switch 170, such as for transmission to the second IED 234 via the second MACsec communication link 252. The switch 170 may also establish a fourth MACsec communication link 256, which may be a receiving-type unidirectional MACsec communication link that enables the third IED 236 to receive encrypted data from the switch 170, such as encrypted data transmitted from the first IED 232 to the switch 170 via the first MACsec communication link 250. The switch 170 may additionally establish a fifth MACsec communication link 258, which may be another receiving-type unidirectional MACsec communication link that enables the third IED 236 to receive encrypted data from the switch 170 separately from the encrypted data received from the switch 170 via the fourth MACsec communication link 256, such as encrypted data received from another component (e.g., another IED separate from the IEDs 232, 234, 236) communicatively coupled to the switch 170. Indeed, a separate MACsec communication link (e.g., a separate unidirectional MACsec communication link) may be established between the switch 170 and the third IED 236 to enable the third IED 236 to receive data transmitted from different components to the switch 170 and intended for the third IED 236. In other words, the switch 170 may transmit respective data from different components to the third IED 236 via separate MACsec communication links. In additional or alternative embodiments, a single MACsec communication link (e.g., a single unidirectional MACsec communication link) may be established between the switch 170 and the third IED 236 to enable the third IED 236 to receive data from different components. That is, in such embodiments, the switch 170 may transmit respective data from different components to the third IED 236 via the same MACsec communication link.

In the illustrated embodiment, the third IED 236 may transmit respective data to different components via the same third MACsec communication link 254. Accordingly, the switch 170 may receive respective data from the third IED 236 via the third MACsec communication link 254, and the switch 170 may transmit the respective data to different components (e.g., to different recipient IEDs) via different MACsec communication links. In additional or alternative embodiments, the switch 170 may establish multiple transmission-type unidirectional MACsec communication links with the third IED 236 to enable the third IED 236 to transmit respective data via the different transmission-type unidirectional MACsec communication links. That is, the switch 170 may receive respective data, such as data to be transmitted to different components, from the third IED 236 via separate MACsec communication links.

Each of the MACsec communication links may be associated and established based on a particular protocol (e.g., indicated via any of the information 238, 242, 246). Thus, a particular one of the MACsec communication links may be used based on data to be communicated via the associated protocol. In this manner, data may be more accurately transmitted between the IEDs 232, 234, 236 and the switch 170. By way of example, the second MACsec communication link 252 may be associated with a first protocol (e.g., a first protocol to transmit data from the switch 170 to the second IED 234), and the fourth MACsec communication link 256 may be associated with a second protocol (e.g., a second protocol to transmit data from the switch 170 to the third IED 236). The switch 170 may receive data and determine the protocol with which the data is to be transmitted. For instance, in response to a determination that the data is to be transmitted via the first protocol, the switch 170 may select and use the second MACsec communication link 252 to transmit the data to the second IED 234 instead of selecting and using the fourth MACsec communication link 256 or any other MACsec communication link that is not associated with the first protocol. That is, the switch 170 may select a MACsec communication link associated with the protocol with which data is to be transmitted in order to transmit the data in a desirable. In this manner, the switch 170 may transmit data more accurately to an intended recipient via a corresponding MACsec communication link.

In certain embodiments, the IEDs 232, 234, 236 may transmit the information 238, 242, 246, respectively, to the switch 170 prior to there being any secure communication links (e.g., MACsec communication links) established between the IEDs 232, 234, 236 and the switch 170. In additional or alternative embodiments, the IEDs 232, 234, 236 may transmit the information 238, 242, 246, respectively, to the switch 170 after secure communication links have been established in order to update the secure communication links. By way of example, the MACsec communication links 250, 252, 254, 256, 258 may have been previously established, and any of the IEDs 232, 234, 236 may transmit updated information to the switch 170. The switch may then add an additional MACsec communication link (e.g., an additional transmission-type unidirectional MACsec communication link, an additional receiving-type unidirectional MACsec communication link), remove any of the existing MACsec communication links, modify any of the existing MACsec communication links, or otherwise update the MACsec communication links. Indeed, the IEDs 232, 234, 236 may periodically transmit updated information to ensure the established MACsec communication links are accurate.

As described above, the MACsec communication links 250, 252, 254, 256, 258 may improve an operation of the electric power distribution system 100. For example, each of the MACsec communication links 250, 252, 254, 256, 258 may block (e.g., prevent, inhibit) communication of data in an undesirable direction. Indeed, transmission-type unidirectional MACsec communication links (e.g., the first MACsec communication link 250 and the third MACsec communication link 254) may block data flow from the switch 170. Further, receiving-type unidirectional MACsec communication links (e.g., the second MACsec communication link 252, the fourth MACsec communication link 256, the fifth MACsec communication link 258) may block data flow to the switch 170. As a result, the MACsec communication links 250, 252, 254, 256, 258 may ensure that the data flow between the switch 170 and the IEDs 232, 234, 236 is accurate.

Although the illustrated MACsec communication links 250, 252, 254, 256, 258 communicatively couple the IEDs 232, 234, 236 to the switch 170, additional or alternative MACsec communication links may communicatively couple the IEDs 232, 234, 236 directly with one another. For example, one of the IEDs 232, 234, 236 may transmit data directly to another one of the IEDs 232, 234, 236 via a MACsec communication link without having to initially transmit the data to the switch 170. Such a MACsec communication link may remain unidirectional and may block data from being transmitted in a reverse direction, thereby maintaining a particular flow of data that is communicated directly between the IEDs 232, 234, 236.

Each of FIGS. 4 and 5 below illustrates a method associated with establishment of and/or communication via a secure communication link. In some embodiments, each of the methods may be performed by a single respective component, such as by the computing system 200 (e.g., the processor 202). In additional or alternative embodiments, multiple components may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 4:
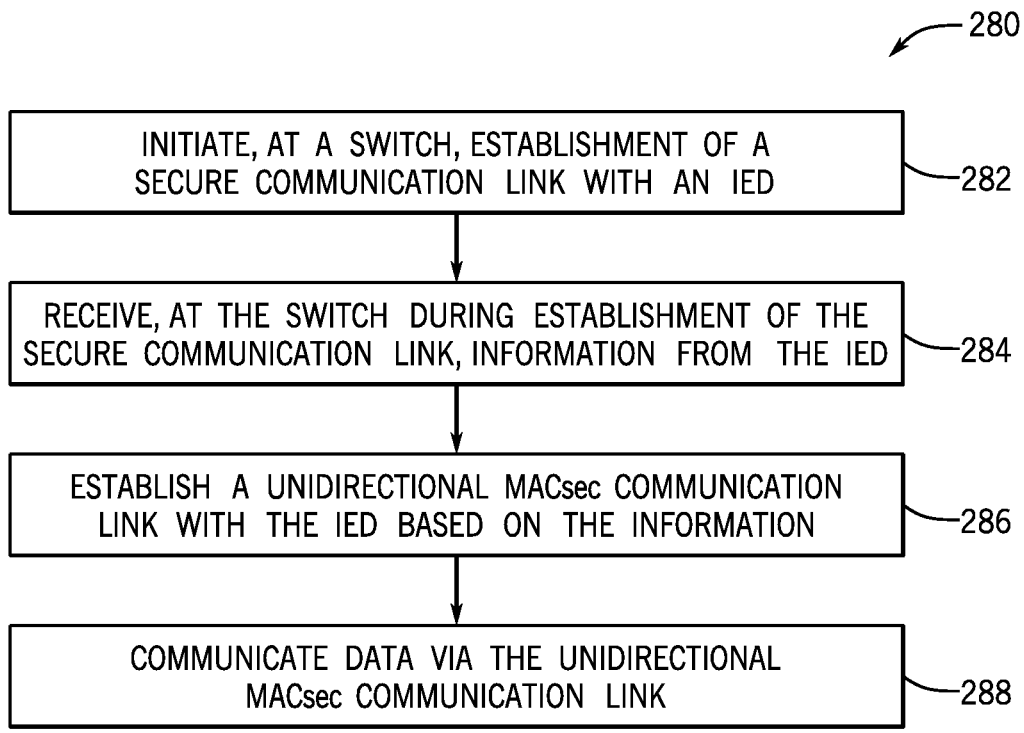
FIG. 4 is a flowchart of an embodiment of a method for establishing a secure communication link or channel, in accordance with an embodiment of the present disclosure.

FIG. 4 is a flowchart of an embodiment of a method 280 for establishing a secure communication link or channel. The method 280 is described from the perspective of the switch 170. However, the method 280 may be performed by any other suitable component, such as an IED or another control system. At block 282, the switch 170 may initiate an establishment of the secure communication link with an IED, such as one of the IEDs 232, 234, 236. For example, the switch 170 may initiate the establishment of the secure communication link in response to a user input (e.g., to initiate establishment of the adoption link between the switch 170 and the IED) and/or automatically (e.g., based on a physical connection between the switch 170 and the IED).

At block 284, the switch 170 may receive information from the IED during establishment of the secure communication link. By way of example, the switch 170 may receive the information via an MKA connectivity association established between the switch 170 and the IED. The information may include a protocol to be used by the IED to communicate data, as well as whether the IED is to transmit and/or to receive data via the protocol.

At block 286, the switch 170 may establish a unidirectional MACsec communication link with the IED based on the information. In an example, the information may indicate that the IED is a subscriber and is to receive certain data from the switch 170 (e.g., data transmitted from an additional IED to the switch 170). In response, the switch 170 may establish a receiving-type unidirectional MACsec communication link to enable data to be transmitted from the switch 170 to the IED via the receiving-type unidirectional MACsec communication link while blocking or preventing data from being transmitted from the IED to the switch 170 via the receiving-type unidirectional MACsec communication link. In another example, the information may indicate that the IED is a publisher and is to transmit certain data to the switch 170 (e.g., data to be subsequently transmitted from the switch 170 to an additional IED). Thus, the switch 170 may establish a transmission-type unidirectional MACsec communication link to enable data to be transmitted from the IED to the switch 170 via the transmission-type unidirectional MACsec communication link while blocking or preventing data from being transmitted from the switch 170 to the IED via the transmission-type unidirectional MACsec communication link. Further, the unidirectional MACsec communication link may be established based on the protocol indicated by the information received from the IED That is, the unidirectional MACsec communication link may be associated with a particular protocol, and the MACsec communication link may be specifically used to communicate data via the particular protocol.

At block 288, upon establishment of the unidirectional MACsec communication link, the switch 170 may communicate data with the IED via the unidirectional MACsec communication link. Indeed, the switch 170 may transmit data to the IED via a receiving-type unidirectional MACsec communication link, such as based on the receiving-type unidirectional MACsec communication link being associated with a protocol with which the data is to be transmitted, and/or the switch 170 may receive data from the IED via a transmission-type unidirectional MACsec communication link. For instance, the switch 170 may use an SAK to encrypt data and transmit the encrypted data via a receiving-type unidirectional MACsec communication link. Additionally or alternatively, the switch 170 may receive encrypted data transmitted via a transmission-type unidirectional MACsec communication link, decrypt the encrypted data via an SAK, re-encrypt the data via another SAK, and transmit the encrypted data to another component (e.g., via another receiving-type unidirectional MACsec communication link).

The switch 170 may repeat performance of the procedures described with respect to any of the blocks 282-288. For example, the switch 170 may initiate establishment of multiple unidirectional MACsec communication links with different IEDs based on information received from one of the IEDs and/or based on information received from multiple IEDs in order to establish respective unidirectional secure communication links with multiple IEDs. The switch 170 may also initiate establishment of multiple secure communication links with the same IED based on information received from the IED and/or based on information received from multiple IEDs. Further still, based on the information received from one of the IEDs, the switch 170 may establish a unidirectional MACsec communication link that directly communicatively couples IEDs to one another. In this manner, the switch 170 may enable the IEDs to communicate with one another directly via the unidirectional MACsec communication link.

Figure 5:
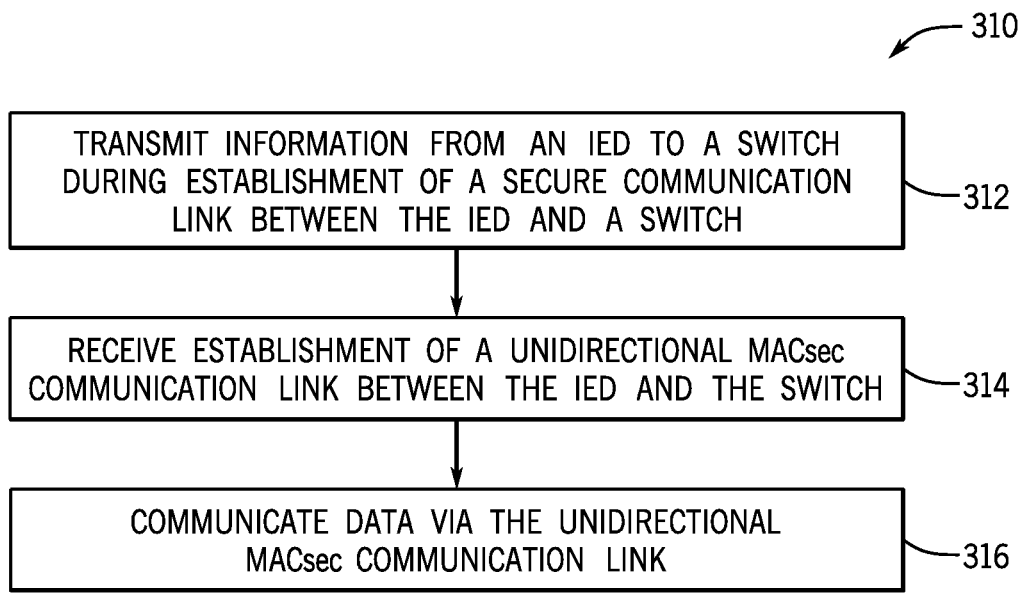
FIG. 5 is a flowchart of an embodiment of a method for communicating via a secure communication link or channel, in accordance with an embodiment of the present disclosure.

FIG. 5 is a flowchart of an embodiment of a method 310 for communicating via a unidirectional secure communication link or channel. The method 310 is described from the perspective of an IED (e.g., one of the IEDs 104, 106, 108, 115, 232, 234, 236) to communicate data with another component (e.g., another control system), such as the switch 170 or another IED At block 312, the IED may transmit information to the switch 170 during establishment of a secure communication link between the IED and the switch 170, such as in response to the initiation of the establishment of the secure communication link described with respect to the procedure described in block 282 of the method 280. That is, the IED may transmit the information via an MKA connectivity association established between the IED and the switch 170.

At block 314, the IED may receive establishment of a unidirectional MACsec communication link between the IED and the switch 170. The unidirectional MACsec communication link may be established based on the information transmitted from the IED to the switch 170 with respect to the procedure described in block 312. Indeed, the unidirectional MACsec communication link may enable the IED to receive data from the switch 170 while blocking or preventing the IED from transmitting data to the switch 170 based on the information indicating that the IED is a subscriber. Moreover, the unidirectional MACsec communication link may enable the IED to transmit data from the switch 170 while blocking or preventing the IED from receiving data from the switch 170 based on the information indicating that the IED is a publisher.

At block 316, the IED may communicate data via the unidirectional MACsec communication link. For example, the IED may transmit data to the switch 170 based on the unidirectional MACsec communication link being a transmission-type unidirectional MACsec communication link. For example, the IED may encrypt data via an SAK and transmit the encrypted data via the transmission-type unidirectional MACsec communication link. Moreover, the IED may receive data from the switch 170 based on the unidirectional MACsec communication link being a receiving-type unidirectional MACsec communication link. Indeed, the IED may use an SAK to decrypt encrypted data received via the receiving-type unidirectional MACsec communication link.

In some embodiments, the IED may perform any of the procedures described with respect to block 312-316 multiple times. By way of example, the IED may receive establishment of multiple unidirectional MACsec communication links (e.g., multiple receiving-type unidirectional MACsec communication links) in response to transmitting information to the switch 170. The IED may therefore communicate data via any of the unidirectional MACsec communication links (e.g., based on a protocol used to communicate the data, based on an intended recipient component to which the data is to be transmitted, based on a component from which the data is to be received).

While specific embodiments and applications of the disclosure have been illustrated and described, it is to be understood that the disclosure is not limited to the precise configurations and components disclosed herein. For example, the systems and methods described herein may be applied to an industrial electric power distribution system or an electric power distribution system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
   an intelligent electronic device (IED); and
   a control system configured to perform operations comprising:
      initiating establishment of a media access control security (MACsec) communication link via a MACsec key agreement (MKA) protocol;
      distributing a connectivity association key (CAK) to the IED in response to initiation of the establishment of the MACsec communication link;
      identifying information associated with the IED in response to initiation of the establishment of the MACsec communication link, wherein the information is indicative of a protocol to be used by the IED to communicate data;
      establishing an MKA connectivity association upon verification of the IED possessing the CAK;
      distributing a security association key (SAK) to the IED via the MKA connectivity association to establish a unidirectional MACsec communication link with the IED; and
      establishing the unidirectional MACsec communication link based on the information associated with the IED.

2. The system of claim 1, wherein the control system is configured to perform operations comprising:
   determining that the IED is a publisher based on the information associated with the IED; and
   establishing the unidirectional MACsec communication link to enable the IED to transmit data via the unidirectional MACsec communication link and to block data from being received by the IED via the unidirectional MACsec communication link in response to a determination that the IED is a publisher.

3. The system of claim 1, wherein the control system is configured to perform operations comprising:
   determining that the IED is a subscriber based on the information associated with the IED; and
   establishing the unidirectional MACsec communication link to enable the IED to receive data via the unidirectional MACsec communication link and to block data from being transmitted by the IED via the unidirectional MACsec communication link in response to a determination that the IED is a subscriber.

4. The system of claim 1, wherein the control system is configured to receive the information from the IED via the MKA connectivity association.

5. The system of claim 1, wherein the IED is configured to use the SAK to encrypt data to be transmitted from the IED via the unidirectional MACsec communication link or to decrypt data received by the IED via the unidirectional MACsec communication link.

6. The system of claim 1, wherein the control system is configured to use a copy of the SAK to encrypt data to be transmitted from the control system via the unidirectional MACsec communication link or to decrypt data received by the control system via the unidirectional MACsec communication link.

7. A tangible, non-transitory, computer-readable medium comprising instructions, wherein the instructions, when executed by processing circuitry, are configured to cause the processing circuitry to perform operations comprising:
   initiating establishment of a media access control security (MACsec) communication channel with an intelligent electronic device (IED) of an electric power distribution system via a MACsec key agreement (MKA) protocol;
   distributing a connectivity association key (CAK) to the IED in response to initiation of the establishment of the MACsec communication link;
   receiving information from the IED during establishment of the MACsec communication channel, wherein the information is indicative of a protocol to be used by the IED to communicate data;
   establishing an MKA connectivity association upon verification of the IED possessing the CAK;
   distributing a security association key (SAK) to the IED via the MKA connectivity association to establish a unidirectional MACsec communication link with the IED; and,
   establishing a transmission-type unidirectional MACsec communication channel, a receiving-type unidirectional MACsec communication channel, or both, based on the information received from the IED.

8. The tangible, non-transitory, computer-readable medium of claim 7, wherein the transmission-type unidirectional MACsec communication channel enables data to be transmitted from the IED via the transmission-type unidirectional MACsec communication channel and prevents data from being received by the IED via the transmission-type unidirectional MACsec communication channel, and the receiving-type unidirectional MACsec communication channel enables data to be received by the IED via the receiving-type unidirectional MACsec communication channel and prevents data from being transmitted by the IED via the receiving-type unidirectional MACsec communication channel.

9. The tangible, non-transitory, computer-readable medium of claim 7, wherein the instructions, when executed, are configured to cause the processing circuitry to perform operations comprising:
   establishing the receiving-type unidirectional MACsec communication channel with the IED to enable transmission of data to the IED via the receiving-type unidirectional MACsec communication channel;
   initiating establishment of an additional MACsec communication channel with an additional IED of the electric power distribution system via the MKA protocol;
   receiving additional information from the additional IED during establishment of the additional MACsec communication channel, wherein the additional information is indicative of an additional protocol to be used by the additional IED to communicate data; and
   establishing an additional receiving-type unidirectional MACsec communication channel with the additional IED based on the additional information received from the additional IED to enable transmission of data to the additional IED via the additional receiving-type unidirectional MACsec communication channel.

10. The tangible, non-transitory, computer-readable medium of claim 9, wherein the instructions, when executed, are configured to cause the processing circuitry to perform operations comprising:
receiving selected data;
determining whether the selected data is to be communicated via the protocol or the additional protocol;
transmitting the selected data to the IED via the receiving-type unidirectional MACsec communication channel in response to a determination that the selected data is to be communicated via the protocol; and
transmitting the selected data to the additional IED via the additional receiving-type unidirectional MACsec communication channel in response to a determination that the selected data is to be communicated via the additional protocol.

11. The tangible, non-transitory, computer-readable medium of claim 7, wherein the instructions, when executed, are configured to cause the processing circuitry to perform operations comprising:
establishing the transmission-type unidirectional MACsec communication channel with the IED to enable transmission of data from the IED via the transmission-type unidirectional MACsec communication channel; and
establishing the receiving-type unidirectional MACsec communication channel with an additional IED of the electric power distribution system based on the information received from the IED to enable transmission of data to the additional IED via the receiving-type unidirectional MACsec communication channel.

12. The tangible, non-transitory, computer-readable medium of claim 11, wherein the instructions, when executed, are configured to cause the processing circuitry to perform operations comprising:
receiving selected data from the IED via the transmission-type unidirectional MACsec communication channel; and
transmitting the selected data to the additional IED via the receiving-type unidirectional MACsec communication channel upon receiving the selected data from the IED.

13. The tangible, non-transitory, computer-readable medium of claim 7, wherein the instructions, when executed, are configured to cause the processing circuitry to establish the transmission-type unidirectional MACsec communication channel, the receiving-type unidirectional MACsec communication channel, or both, directly between the IED and an additional IED.

14. The tangible, non-transitory, computer-readable medium of claim 7, wherein the information comprises a plurality of protocols used by the IED to communicate data, and the instructions, when executed, are configured to cause the processing circuitry to establish a plurality of receiving-type unidirectional MACsec communication channels with the IED based on the information received from the IED, each of the plurality of receiving-type unidirectional MACsec communication channels being associated with one of the plurality of protocols of the information received from the IED.

15. The tangible, non-transitory, computer-readable medium of claim 7, wherein the information comprises a plurality of protocols used by the IED to transmit data, and the instructions, when executed, are configured to cause the processing circuitry to establish the transmission-type unidirectional MACsec communication channel based on the information received from the IED to enable the IED to transmit data via the transmission-type unidirectional MACsec communication channel using any of the plurality of protocols.

16. An intelligent electronic device (IED) of an electric power distribution system, the IED comprising:
processing circuitry; and
memory storing instructions, wherein the instructions, when executed by the processing circuitry, are configured to cause the processing circuitry to perform operations comprising:
transmitting information to a switch during establishment of a media access control security (MACsec) communication link between the IED and the switch, wherein the information is indicative of a protocol used by the IED to communicate data;
receiving a connectivity association key (CAK) in response to initiation of the establishment of the MACsec communication link;
transmitting to the switch a verification of processing of the CAK;
receiving establishment of a unidirectional MACsec communication link between the IED and the switch based on the information including a security association key (SAK) received from the switch to establish the unidirectional MACsec communication link; and
communicating data with the switch via the unidirectional MACsec communication link.

17. The IED of claim 16, wherein the unidirectional MACsec communication link is a first unidirectional MACsec communication link, the information is indicative of an additional protocol used by the IED to communicate data, and the instructions, when executed by the processing circuitry, are configured to cause the processing circuitry to perform operations comprising:
receiving establishment of a second unidirectional MACsec communication link between the IED and the switch based on the information;
receiving first data from the switch via the first unidirectional MACsec communication link, wherein the first data is transmitted via the protocol; and
receiving second data from the switch via the second unidirectional MACsec communication link, wherein the second data is transmitted via the additional protocol.

18. The IED of claim 16, wherein the instructions, when executed by the processing circuitry, are configured to cause the processing circuitry to perform operations comprising:
transmitting first data to the switch via the unidirectional MACsec communication link by using a first protocol; and
transmitting second data to the switch via the unidirectional MACsec communication link by using a second protocol.

19. The IED of claim 16, wherein the unidirectional MACsec communication link is a first unidirectional MACsec communication link, and the instructions, when executed by the processing circuitry, are configured to cause the processing circuitry to perform operations comprising:
receiving establishment of a second unidirectional MACsec communication link between the IED and the switch based on the information;
transmitting first data to the switch via the first unidirectional MACsec communication link; and receiving second data from the switch via the second unidirectional MACsec communication link.

\* \* \* \* \*